3,661,837
CONTINUOUS INCORPORATION OF GLASS
FIBERS INTO POLYAMIDES
Anton Cadus, Ludwigshafen, Hermann Uhr, Frankenthal, and Reinhold Weber, Ludwigshafen, Germany, assignors to Badische Anilin- & Soda-Fabrik Aktiengesellschaft, Ludwigshafen am Rhine, Germany
No Drawing. Filed May 27, 1970, Ser. No. 41,080
Claims priority, application Germany, May 29, 1969,
P 19 27 271.0
Int. Cl. C08g 51/10
U.S. Cl. 260—37 N    6 Claims

ABSTRACT OF THE DISCLOSURE

Continuous incorporation of glass fibers into synthetic linear polyamides having periodically recurring amide groups in the main chain in a screw extruder, glass fibers and unmelted plastics granules being supplied simultaneously or successively to the polyamide melt and the unmelted granules serving as comminuting aids.

---

The invention relates to a process for the continuous production of polyamides which have been reinforced with glass fibers having a narrow length distribution in which the length of the glass fibers can be controlled in a simple way.

The incorporation of glass fibers into thermosetting resins, particularly casting resins, by manual methods such as lay-up or winding techniques, has been known for a long time. More recently, use has been made of short glass fibers in injection molding, and the premix method with thermosetting resins.

Analogous methods have been introduced for thermoplastics, for example the lay-up method in the case of caprolactam polymerized by anionic polymerization or the use of short glass fibers with the majority of thermoplastics processed in extruders. Particularly the latter method has resulted in valuable products. Glass fiber reinforced thermoplastics based on polystyrene or modified polystyrenes, polypropylene, polyformaldehyde, polycarbonates and polyamides have proved to be particularly suitable.

Furthermore a number of very different methods have become known for incorporating glass fibers into thermoplastics. Thus it has been proposed to mix short glass fibers such as those known as ground fibers or chopped strands with resin powder or chips and to press-mold the resultant mixture. In this method however only products showing non-uniform distribution of the fibers are obtained. Moldings prepared from such mixes therefore exhibit greatly fluctuating strength properties and unsightly surfaces. It has therefore been recommended that the fibers should be more effectively distributed by kneading. It is difficult however to mix resin granules or powder with an amount of short glass fibers which is adequate for production work and to meter such a resin/fiber mix more or less accurately. Several kneading processes with stagewise addition of glass fibers are therefore generally necessary for the production of a homogeneous product. Marked wear on the machinery and very short fiber lengths have to be tolerated.

It is also known that continuous filaments may be drawn through a molten resin and thus coated. Granules containing glass fibers prepared by these sheathing methods can have bunches of fibers pulled out from them because of the poor key between the fibers and the resin. It is easy to see that on the basis of such a starting material it is not possible to achieve a uniform distribution of the fibers while retaining their length and therefore only parts showing fiber bunching can be prepared.

Moreover it has already been proposed to incorporate glass fibers of a definite length into a molten resin, to break them up to the desired length by kneading, to distribute them uniformly in the melt, to extrude the product through a die and then to granulate it. It is difficult however to introduce the very voluminous chopped strands into the melt and to incorporate them while breaking them up to the desired length, so that to achieve a high content of glass fibers again it is necessary to pass the material several times through the machine or to use very costly equipment. In recent years methods have therefore been developed in which continuous filaments are used. The strands entering at a controlled speed through the extruder inlet provided for introducing glass fibers into the resin melt may be cut to the desired length and the chopped material may be introduced fairly compactly into the melt. It is also possible however to introduce the continuous filament bundle into the extruder after the resin has been melted and to vary the amount of the glass fibers mixed in by means of the speed of the screw, the screw charge and the thickness of the strand. Both when chopped strands are used and when continuous filaments are introduced, the breaking up of the fibers to the desired length is effected by kneading units incorporated into the extruder. The effectiveness of these units depends however on the glass fibers to be broken up, on the amount and nature of the thermoplastics and on the ratio of the amount of glass fibers to the amount of thermoplastics. Thus in the case of a high throughput and a low fiber content relatively long fibers are usually obtained and this may have an undesirable effect in processing and on the surface of the finished parts.

In incorporation methods of this type, glass reinforced articles are obtained in which the lengths of the incorporated fibers are very different. The wide length distribution of the fibers often gives rise to trouble in conventional methods of manufacture. In particular it results in repeated breakage of the strands extruded for the production of granules. Moreover granules which contain glass fibers having a wide length distribution exhibit an irregular flow behavior in further processing and this may be troublesome in the production of moldings. The moldings themselves are "mechanically anisotropic," i.e. they exhibit strength properties which differ locally. In order to be able to prepare glass reinforced thermoplastics which contain glass fibers of approximately equal length with a minimum of disturbances, it is therefore necessary to install kneading units which are suitable for specific fiber concentration and machine loadings. These difficulties may be obviated in the case of thermoplastics having a wide softening range, i.e. having a melt viscosity which depends strongly on temperature such as polystyrenes or polyolefins, by varying the temperature of the product. In the case of thermoplastics having a narrow melting range, i.e. having a melt viscosity which is substantially independent of temperature it is not possible by this measure to influence the comminution work to be performed in the extruder.

It is an object of the invention to provide a process for the continuous incorporation of glass fibers into synthetic linear polyamides having recurring amide groups as an integral part of the main polymer chain in a screw extruder in which the glass fibers are supplied, while avoiding metering difficulties, in one operation to a polyamide melt upstream of kneading means provided in the screw extruder, are comminuted in the melt, are uniformly mixed into the melt and the mixture obtained is continuously discharged from the extruder.

A further object of this invention is to provide a process for the continuous incorporation of glass fibers into polyamides, in which the glass fibers to be incorporated into the polyamide are longer than in the incorporation of comparable industrial methods, and even at low glass fiber contents exhibit a narrow length distribution so that products having improved mechanical properties are obtained.

Another important object of this invention is to provide a process for the continuous incorporation of glass fibers into polyamides in which wear phenomena in the comminution equipment are kept low and a decrease in the output of the comminution equipment as a result of wear phenomena can be compensated for to a certain extent so that the process becomes particularly economical.

The said objects are achieved according to the present invention by continuously melting a synthetic linear polyamide having recurring amide groups as an integral part of the main polymer chain in a screw extruder which is provided with kneading means supplying glass fibers and unmelted polyamide granules to the polyamide melt simultaneously or successively but upstream of the kneading means which comminutes the glass fibers, the unmelted polyamide granules serving as a comminution aid for the glass fibers as they pass through the kneading means, and continuously discharging the mixture obtained from the screw extruder. Processing in the extruder is carried out with an advantageous residence time of the polyamide of 60 to 180 seconds, preferably 90 to 150 seconds. The processing temperature ranges from 150° to 300° C., preferably from 180° to 280° C., depending on the melting range of the polyamide.

In the new process the kneading means rigidly installed in the screw extruder is assigned only the basic work which has to be done in any case, the amount of comminution work to be done in excess of this basic amount being assigned to an additional comminuting means of which the amount can be varied according to requirements without much modification of the equipment.

To carry out the process according to this invention the glass fibers are supplied to the polyamide melt present in a screw extruder through an inlet which (with reference to the direction of conveyance of the screw extruder) is 10 to 50 cm., preferably 15 to 40 cm., ahead of kneading means installed in the screw extruder. The residence time of the unmelted granules from the feed inlet to the kneading means is from 5 to 30, preferably 10 to 24 seconds. Adjustment of the desired fiber content offers no difficulty because the feed rate of the strand is proportional to the speed of the screw shaft and the number of strands to be fed in many be varied from one to twenty. It is preferred to supply from six to twelve strands. The strands are advantageously used in the form of rovings as described further below. The granules serving as comminuting aids may be metered into the melt through the same feed inlet or another inlet which is upstream (with reference to the direction of conveyance of the extruder) or downstream of the feed inlet for the glass fibers but ahead of the kneading means.

The comminuting effect is dependent on the amount of unmelted granules and on the point at which the granules are fed in. It increases as the amount of unmelted granules is increased. The amount of unmelted granules may be up to 20% of the total weight of the polyamide. It is preferably from 2 to 15%.

The point at which the granules are fed in is also of great influence. The shorter the path of the unmelted granules in the screw extruder up to the kneading means, the greater the comminuting effect which the granules exert.

The process according to the invention has the advantage that the glass fibers can readily be reduced to the desired average length without any modification to the apparatus used and merely by varying the amount of granules supplied and/or the point at which they are supplied. Another advantage is the possibility of continuing to use in the screw extruder a kneading means after it begins to show wear phenomena and making up for the decrease in comminution work by increasing the amount of granules.

The process according to the invention permits the production of glass fiber reinforced polyamides whose glass fiber content varies within wide limits. Generally it is possible to obtain in one operation products having from 0.5 to 70 parts by weight of glass fibers to 100 parts of the mixture of glass fibers and polyamide. Products having a content of 20 to 60 parts by weight of glass fibers are preferred. The glass fibers incorporated into the polyamide fiber mix have a narrow length distribution.

In an advantageous embodiment of the process according to the invention a particulate or powdered polyamide whose particle size is about 10 mm. preferably 1 to 4 mm., is melted in a twin-screw extruder provided with devolatilizing means. The volatile components of the melt are removed in the conventional manner during extrusion. The glass fibers and the unmelted granules added as comminution aid are preferably fed in together through a port arranged behind the melting zone, the fibers being in the form of rovings and the desired fiber content in the plastic being adjusted by way of the speed of the screw shaft and the number and thickness of the strands. The fibers are comminuted to the desired length in the melt by a kneading unit provided dowstream of the fiber feed point and mixed; the kneading unit chosen, the amount of granules introduced with the fibers and the point at which the granules are fed in determine the final length of the fibers. After the melt has passed through a calming zone it is extruded in the conventional manner, for example as strands or as a ribbon. The residence time of the resin, into which the glass fibers have been incorporated, in the extruder is from about 60 to 180, preferably from 80 to 120, seconds.

It is an advantage that the metering of both the glass fibers and the unmelted granules serving as comminution aid does not offer any difficulty. Moreover the heavy wear on the machines observed in the conventional methods is substantially avoided. Another advantage of the new process is that the length of the glass fibers can be varied within the range which is industrially significant.

The polyamides suitable for the process according to the invention are particularly polyamides prepared by conventional methods, as for example polylactams such as polycaprolactam, polycapryllactam, polylaurolactam or polyenantholactam, nylon 6,6, nylon 6,10, nylon 6,12 or poly-11-aminoundecanoic acid and copolymers of the starting materials on which these polyamides are based. The polymers have a molecular weight of 15,000 to 40,000, preferably 17,000 to 30,000. Mixtures of the said polyamides may also be used. The process may be used however for the incorporation of glass fibers into all other thermoplastics, particularly into plastics having a narrow melting range, e.g. polyesters such as polyglycol terephthalate, polyacetals such as polyformaldehyde, or polyacetaldehyde and also polycarbonates which have been prepared in the usual way. The resin may be used in powder form or, for example, as granules or chips.

Suitable screw extruders are those having one shaft or more than one shaft, a continuous kneader or a kneader with helical blades. Twin shaft extruders having self-cleaning screws, kneading means such as discs, blocks and/or adjustable gaps are particularly suitable.

The glass fibers are preferably used in the form of rovings, which may consist of up to more than 60 strands of which each may contain up to more than 400 individual filaments. The individual filaments have a mean diameter of about $10^{-3}$ cm. or less. The filaments may be devoid of size or finished with conventional sizes. If necessary the size may be removed by burning or dissolving prior to introduction of the fibers into the extruder.

Instead of continuous filament there may also be used chopped strands, glass wool or glass fibers in other forms. The incorporated glass fibers produce a considerable improvement in the mechanical properties of the fiber-reinforced product when they form a coherent skeleton within the resin. This condition is achieved when a glass fiber skeleton remains upon incineration of the article. To ensure this, a minimum length or a minimum ratio of length to thickness of the glass fibers has to be maintained. The mean length in the process according to the invention is from 200 to 600, preferably from 300 to 500, microns. The ratio of length to thickness is about 40:1. It is possible with a fairly uniform distribution of the glass fibers to achieve a further improvement in the mechanical properties with substantially higher quotients but an inferior processability of the resin and the risk of inadequate distribution of the glass fibers have to be tolerated in consequence.

The unmelted granules which are supplied to the polyamide melt as a comminution aid shortly prior to or shortly after or together with the glass fibers preferably have the same chemical constitution as the molten polyamide. It is possible however to use granules having a composition different from that of the molten polyamide. Moreover a masterbatch which contains the conventional additives may be used as the unmelted granules. In this case a screw extruder should be used which ensures not only complete melting of the granules but also adequate mixing with the molten polyamide.

To ensure satisfactory distribution of the additives, these are preferably added directly to the polyamide which is to be reinforced with glass fibers. They may be incorporated therewith before or after the melting in carrying out the process of the invention. The additives may be of conventional types, such as dyes, plasticizers, lubricants, stabilizers or optical brighteners.

Glass-fiber reinforced polyamides prepared according to the invention are distinguished by a high modulus of elasticity, great stiffness, good dimensional stability and high thermal stability. They have the advantage over glass-fiber reinforced polyamides prepared by prior art methods of a narrow length distribution of the incorporated glass fibers, the length being independent of the content of glass fibers even when this content is low.

Glass fiber reinforced polyamides according to the invention may be processed by conventional methods as for example by injection molding, centrifugal casting or extrusion, with or without intermediate granulation, into dimensionally and thermally stable moldings which meet high mechanical strength requirements and moreover exhibit a smooth, glossy surface.

The following examples illustrate the invention. The parts specified in the examples are by weight.

EXAMPLE 1

75 parts of granules of nylon 6,6 having a molecular weight of about 20,000 is melted at 270° C. in a twin shaft disc kneader with shafts having a working length of 1400 mm. and with at least two devolatilizing ports and two kneading means between the feed hopper and the die plate, the first being 30 mm. before the first port and the second 250 mm. behind the same, molten nylon 6,6 being present at the first port. 20 parts of glass fibers in the form of continuous filament are introduced through the first port and 5 parts of a polyamide batch of 90 parts of nylon 6,6 and 10 parts of calcium stearate in the form of granules having a particle size of about 2.5 mm. is introduced through the following port(s). The individual filaments have a diameter of about 10 microns. The total residence time of the product in the screw is 110 seconds. At a screw speed of 110 r.p.m., a product is withdrawn practically without trouble at the die plate which after it has been cooled and granulated contains glass fibers having an average length of 400 to 450 microns and from which moldings having good surface and mechanical characteristics can be obtained.

EXAMPLE 2

A twin disc kneader is used having a working length of the screw of 2000 mm. and a plurality of devolatilizing ports. 30 parts of a mixture of 68.5 parts of nylon 6 in the form of cylindrical granules about 3 mm. in length and 2.5 mm. in diameter, 30 parts of chopped strands having a length of 3 mm. and a diameter of about $10^{-3}$ cm. and 1.5 parts of calcium stearate are supplied through the first port to 70 parts of nylon 6 having a molecular weight of about 22,000 which has been melted at 220° C. and 110 r.p.m., the whole is mixed in the extruder, the total residence time of the product in the screw being 150 seconds extruded in strand form and granulated. A product is obtained in which the fibers have an average length of 400 microns. Moldings prepared therefrom exhibit excellent mechanical properties, good dimensional and thermal stability and also a smooth glossy surface.

EXAMPLE 3

60 parts of nylon 6 having a molecular weight of about 25,000 is mixed in a high speed mixer with 0.4 part of zinc stearate, 1.0 part of titanium dioxide and 0.1 part of cadmium yellow, melted and kneaded in an extruder and then, through a devolatilizing port having an oval cross-section, first 3 parts of nylon 6 in the form of granules having an edge length of about 2 mm. and then, downstream thereof, 35 parts of continuous filament having a diameter of about $10^{-3}$ are supplied. The total residence time of the product in the screw is 95 seconds. Granules are obtained which may be used for the production of moldings having excellent mechanical and thermal properties with good processability and a very good surface.

We claim:

1. In a process for the continuous incorporation of glass fibers into a synthetic linear polyamide having recurring amide groups as an integral part of the main polymer chain in a screw extruder having forced conveyance in which the glass fibers are supplied to the polyamide melt upstream of kneading means provided in the screw extruder, are comminuted in the melt, are uniformly mixed into the melt and the resultant mixture is continuously discharged from the screw extruder, the improvement which comprises supplying glass fibers and 2–20%, based on the total weight of the polyamide, of unmelted polyamide granules simultaneously or successively to the polyamide melt upstream of the kneading means which comminutes the glass fibers, so that the unmelted polyamide granules serve as a comminution aid for the glass fibers during passage through the kneading mean.

2. A process as claimed in claim 1 in which 0.5 to 70 parts of glass fibers is used for the production of each 100 parts of glass fiber reinforced polyamide.

3. A process as claimed in claim 1 in which the glass fibers are supplied to the screw extruder in the form of rovings.

4. A process as claimed in claim 1 in which the amount of unmelted granules is 2–15% of the total weight of the polyamide.

5. A process as claimed in claim 1 in which the unmelted polyamide granules supplied as comminution aid have the same chemical constitution as the molten polyamide.

6. A process as claimed in claim 1 in which the particle size of the unmelted polyamide granules supplied as comminution aid is from 0.5 to 10 mm.

References Cited

UNITED STATES PATENTS

| | | | |
|---|---|---|---|
| 3,164,563 | 1/1965 | Maxwell | 260—37 |
| 3,304,282 | 2/1967 | Cadus | 260—37 |
| 3,453,356 | 7/1969 | Kent, Jr., et al. | 264—143 |

OTHER REFERENCES

Glass Fiber-Thermoplastic Powder Blends, Schlick et al., SPE Journal, February 1962, vol. 24.

MORRIS LIEBMAN, Primary Examiner

R. ZAITLEN, Assistant Examiner

U.S. Cl. X.R.

106—143; 260—41 AG